(12) United States Patent
Akasaka

(10) Patent No.: US 6,502,659 B2
(45) Date of Patent: Jan. 7, 2003

(54) VEHICLE FRONT STRUCTURE

(75) Inventor: Kousuke Akasaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/891,409

(22) Filed: Jun. 27, 2001

(65) Prior Publication Data

US 2001/0054831 A1 Dec. 27, 2001

(30) Foreign Application Priority Data

Jun. 27, 2000 (JP) ......................... 2000-192364

(51) Int. Cl.[7] ............................. F01N 7/14; B60K 13/04
(52) U.S. Cl. ....................... 180/309; 180/296; 180/89.2; 60/272; 60/282
(58) Field of Search .................. 180/309, 296, 180/89.2, 90, 232; 60/272, 282; 123/198 E

(56) References Cited

U.S. PATENT DOCUMENTS

| | | | | |
|---|---|---|---|---|
| 3,863,445 A | * | 2/1975 | Heath | 280/309 |
| 4,612,767 A | * | 9/1986 | Engquist et al. | 280/309 |
| 5,195,607 A | * | 3/1993 | Shimada et al. | 280/309 |
| 5,464,952 A | * | 11/1995 | Shah et al. | 280/309 |
| 5,555,932 A | * | 9/1996 | Dudley et al. | 280/309 |
| 5,603,297 A | * | 2/1997 | Wolf et al. | 280/309 |
| 5,908,017 A | * | 6/1999 | Kaneko | 280/309 |
| 5,974,784 A | * | 11/1999 | Feldman | 280/309 |
| 6,378,645 B1 | * | 4/2002 | Uegane et al. | 280/309 |

FOREIGN PATENT DOCUMENTS

JP 3028257 2/2001

* cited by examiner

Primary Examiner—Brian L. Johnson
Assistant Examiner—Jeffrey J. Restifo
(74) Attorney, Agent, or Firm—Birch, Stewart, Kolasch & Birch, LLP

(57) ABSTRACT

A vehicle front structure which is partitioned into an engine compartment and a passenger compartment with a dashboard. An exhaust pipe is extended from a rear part of an engine accommodated in the engine compartment to a rear part of the vehicle, beneath the passenger compartment. Between the engine and the dashboard, a steering gearbox, a harness and a plurality of pipes extending transversely of the vehicle are arranged. A heat shielding plate is interposed between the steering gearbox, harness and pipes as a group, and the exhaust pipe. The heat shielding plate blocks heat emitted from the engine and the exhaust pipe from affecting the steering gearbox, harness and pipes.

7 Claims, 5 Drawing Sheets

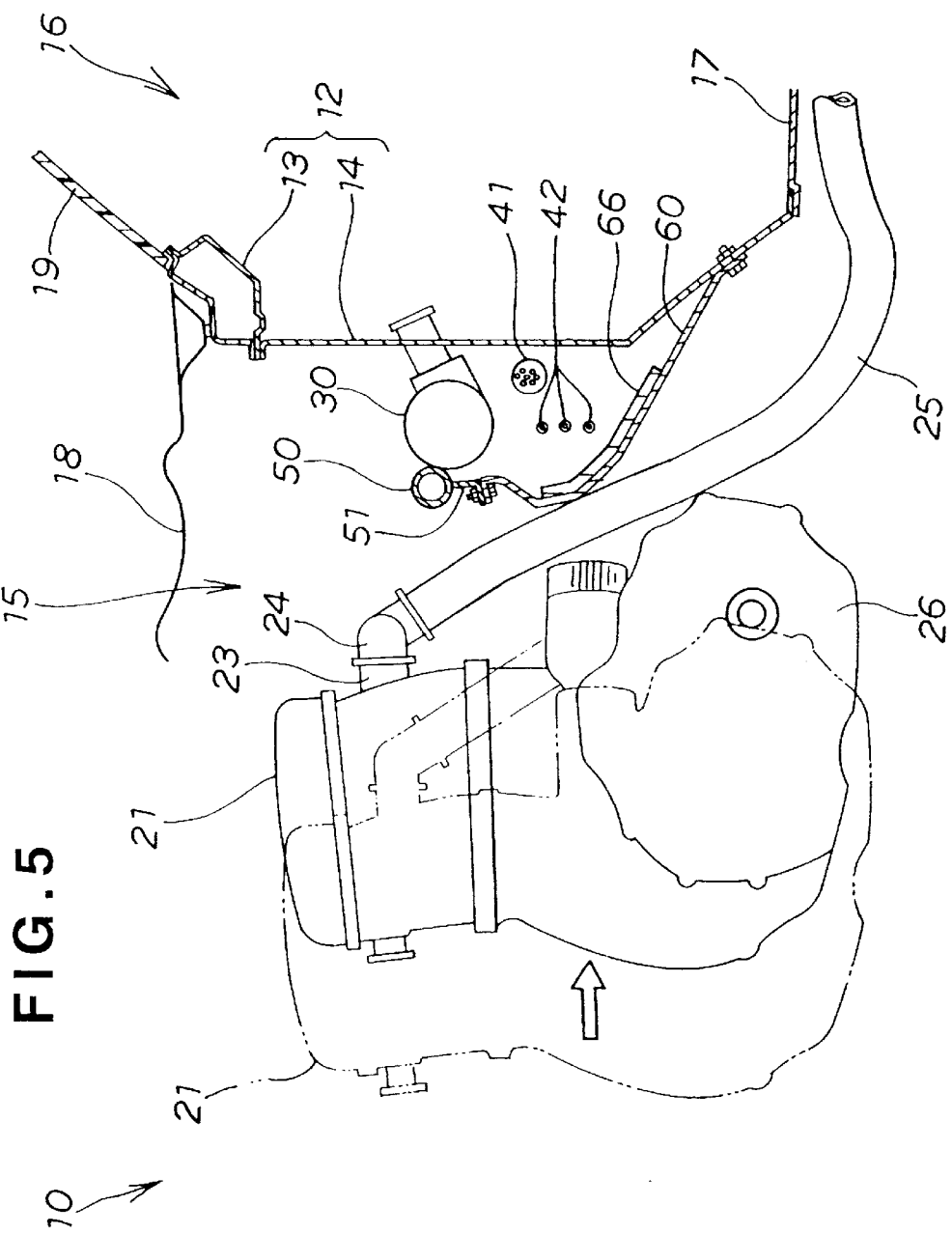

VEHICLE FRONT STRUCTURE

BACKGROUND OF THE INVENTION

1. Field of the Invention

The present invention relates to a front structure for motor vehicles, and especially to a front structure for a steering gearbox, harness and a plurality of pipes not to be subjected to direct heat from an engine and exhaust pipe.

2. Description of the Related Art

A front-engine rear-wheel drive (FR) vehicle with an engine mounted on a front part of the vehicle, which engine drives rear wheels, is disclosed, for example, in Japanese Patent No. 3,028,257.

Such a vehicle is partitioned at its body front part into an engine compartment and a passenger compartment with a dashboard. To the rear of the engine are connected a transmission, propeller shaft and differential gear, to drive the rear wheels. Exhaust gas or emission produced by driving the engine is discharged to the rear of the vehicle through an exhaust pipe extending from a rear part of the engine to the rear of the vehicle.

In the engine compartment, a steering gearbox, harness and pipes (e.g. brake hoses) extending transversely to the vehicle are usually arranged between the dashboard and the engine. The steering gearbox, harness and pipes are disposed close to the exhaust pipe extending from the rear part of the engine. This requires consideration to preventing, to a maximum extent, the steering gearbox, harness and pipes from being thermally affected by the exhaust pipe in the small engine compartment.

SUMMARY OF THE INVENTION

It is therefore an object of the present invention to provide a front structure for vehicles that allows a steering gearbox, harness and pipes extending transversely to the vehicle in an engine compartment to be given a minimum effect of heat produced by an exhaust pipe of an engine.

According to an aspect of the present invention, there is provided a vehicle front structure comprising: a dashboard for partitioning a front part of a body of the vehicle into an engine compartment for accommodating an engine and a passenger compartment; an exhaust pipe extending from a rear part of the engine, beneath the passenger compartment, toward a rear part of the vehicle; a body reinforcing bar extending between the dashboard and the exhaust pipe transversely of the vehicle and detachably mounted at both ends thereof to right and left front side frames in the body front part; and a heat shielding plate interposed between the dashboard and the exhaust pipe, and having a rear end mounted to a lower part of the dashboard and a front end mounted to the body reinforcing bar.

The body reinforcing bar is interposed between the engine and the dashboard, to extend the body reinforcing bar between the right and left front side frames, thereby to reinforce the body front part. The heat shielding plate mounted by the use of the dashboard and the body reinforcing bar is interposed between the exhaust pipe extending from the rear part of the engine and the dashboard, thereby to limit thermal effect from the exhaust pipe to the passenger compartment. In particular, when the steering gearbox, harness and pipes are interposed between the dashboard and the exhaust pipe, the heat shielding plate provided between the steering gearbox, harness and pipes, and the exhaust pipe prevents the steering gearbox, harness and pipes from being directly affected by heat from the exhaust pipe.

If the engine is set back upon a collision of the vehicle, the body reinforcing bar and the heat shielding plate prevent the high-heated engine and the exhaust pipe from directly hitting against the steering gearbox, harness and pipes.

The heat shielding plate having a heat insulating material on at least either upper or lower surface thereof can positively block thermal effect from the engine and the exhaust pipe to the steering gearbox and the other components. In particular, it is preferred to provide the heat insulating material on the upper surface at the side of which the steering gearbox and the other components are arranged because the heat insulating material serves as a cushion at a time of collision of the vehicle to alleviate impact to the steering gearbox and the other components. The heat insulating material is preferably positioned above the exhaust pipe to directly block heat emitted from the exhaust pipe.

Further, it is preferred to arrange the steering gearbox in a higher position than the transmission protruded rearwardly of the engine in order for the transmission not to interfere with the steering gearbox when the transmission is set back upon a collision of the vehicle.

BRIEF DESCRIPTION OF THE ACCOMPANYING DRAWINGS

A preferred embodiment of the present invention will be described in detail below, by way of example only, with reference to the accompanying drawings, wherein:

FIG. 5 is a functional diagram showing the vehicle front structure when the engine is set back upon a collision of the vehicle.

DETAILED DESCRIPTION OF THE PREFERRED EMBODIMENT

The following description is merely exemplary in nature and is in no way intended to limit the invention, its application or uses.

Figure 1:
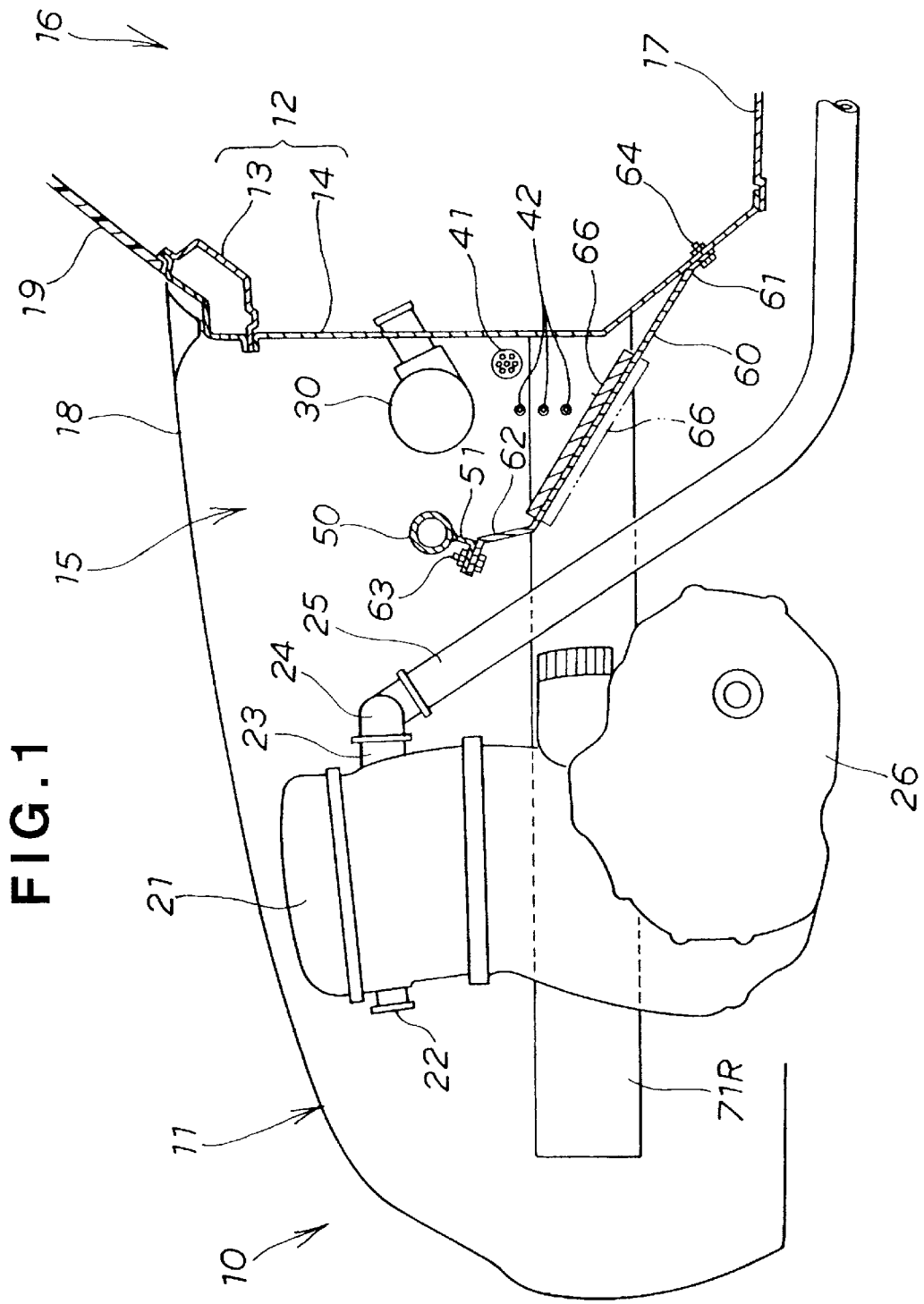
FIG. 1 is a schematic section-in-part diagram of a front structure for a vehicle according to the present invention.

FIG. 1 shows a motor vehicle 10 with a front part of a body 11 partitioned into an engine compartment 15 and a passenger compartment 16 with a dashboard 12. The engine compartment 15 is located in the front part of the vehicle with the dashboard 12 as a boundary, and the passenger compartment 16 is located in the rear part. An engine 21 accommodated in the engine compartment 15 drives rear wheels not shown. The dashboard 12 consists of an upper dashboard (cross member) 13 and a lower dashboard 14. The lower dashboard 14 extends at its lower part obliquely downward in the rear direction, with the bottom end joined to the front end of a floor panel 17.

The exhaust pipe 25 extending from a rear part of the engine 21 extends, running beneath the floor panel 17, to the rear of the vehicle. The engine 21 has an inlet 22 at its upper front face and has an outlet 23 at its upper rear face. To the outlet 23, the exhaust pipe 25 is connected through an exhaust manifold 24. In the figure, reference numeral 18 denotes a hood, 19 a windscreen, and 26 a transmission.

A steering gearbox 30, a harness 41 and a plurality of pipes 42 provided in the engine compartment 15, extending transversely to the vehicle are arranged between the dashboard 21 and the engine 21. The harness 41 is arranged below and rearward of the steering gearbox 30. The pipes 42 are arranged below the steering gearbox 30 in a vertical line. The steering gearbox 30, harness 41 and pipes 42 are arranged close to the side of the lower dashboard 14 in the engine compartment 15. The harness 41 is, for example, a main harness. The pipes 42 are, for example, pipes serving as passages of brake fluid.

This embodiment is characterized in that: (1) a body reinforcing bar 50 extending transversely to the vehicle is disposed between the engine 21 and the steering gearbox 30; (2) a heat shielding plate 60 is interposed between the steering gearbox 30, harness 41 and pipes 42, and the exhaust pipe 25, a rear end 61 of which heat shielding plate 60 being mounted to a lower part of the dashboard 12 and a front end 62 of which heat shielding plate 60 being mounted to the body reinforcing bar 50; and (3) a heat insulating material 66 is provided on at least one side of the heat shielding plate 60.

The body reinforcing bar 50 is a steel pipe located ahead of the steering gearbox 30, extending transversely to the vehicle along the steering gearbox, with a bracket 51 at its lower part.

The heat shielding plate 60 is a flat steel plate demountably mounted at the front end 62 to the bracket 51 of the body reinforcing bar 50 via a bolt 63. The heat shielding plate 60 is, as described above, arranged between the steering gearbox 30, harness 41 and pipes 42, and the exhaust pipe 25, being inclined to extend downwardly to the rear of the vehicle so as to block heat emitted from the exhaust pipe 25. The rear end 61 of the heat shielding plate 60 is detachably mounted to a lower part of the lower dashboard 14 via a bolt 64. Thus the use of the dashboard 12 and the body reinforcing bar 50 provides easy mounting of the heat shielding plate 60.

The heat shielding plate 60 has the heat insulating material 66 in a sheet on at least either the upper or lower surface thereof. The heat insulating material 66 is fixed to the heat shielding plate 60 by sticking with an adhesive, fastening with screws, or some other means.

Figure 2:
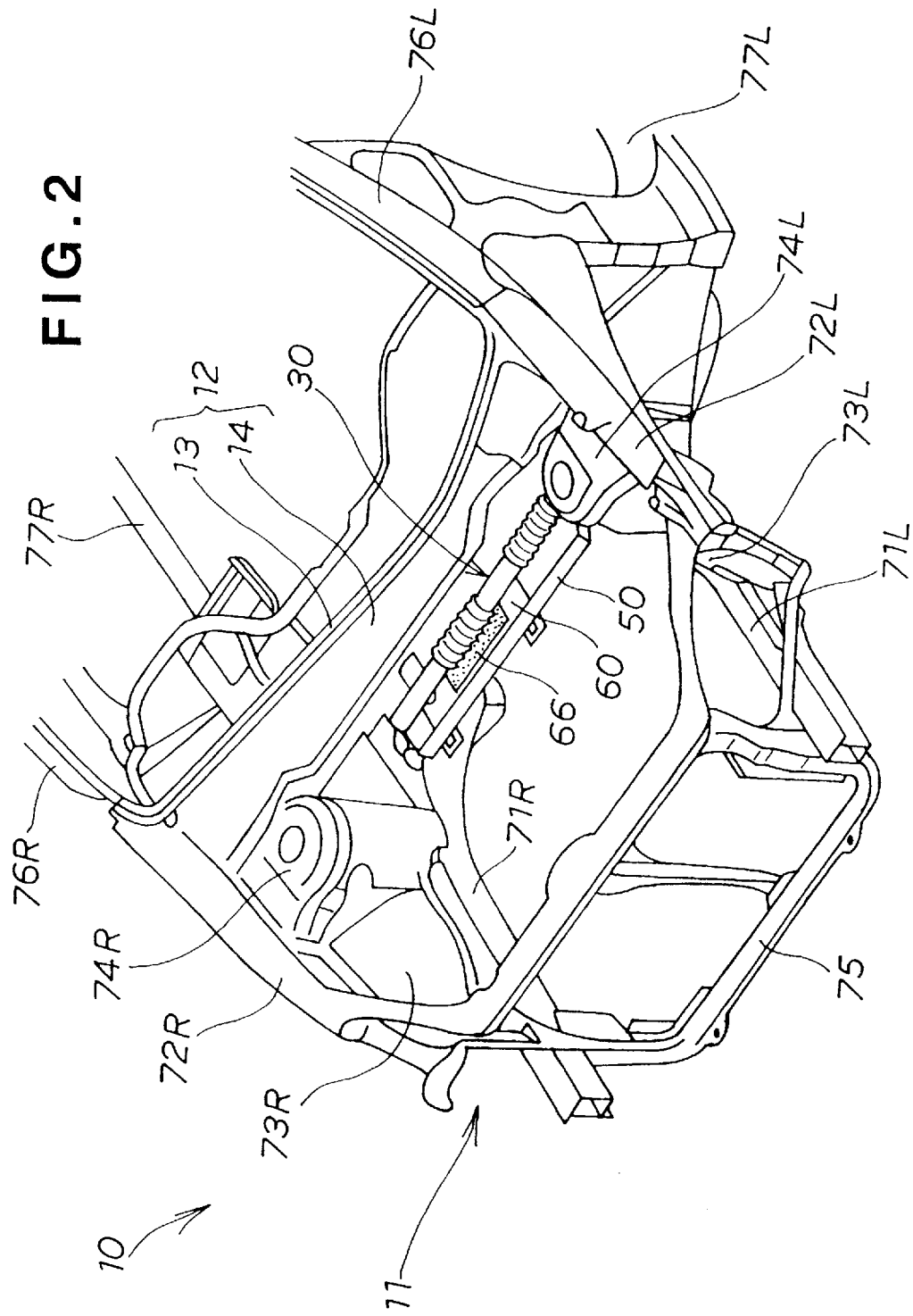
FIG. 2 is a perspective view of the vehicle front structure as shown in FIG. 1.

The front structure of the body 11 is, as shown in FIG. 2, a unitized construction, composed mainly of right and left front side frames 71R, 71L extending longitudinally to the vehicle at both sides of the body front part, right and left upper members 72R, 72L extending longitudinally to the vehicle at laterally outside and obliquely upper positions of the front side frames 71R, 71L, wheel houses 73R, 73L and front damper housings 74R, 74L extending between the front side frames 71R, 71L and the upper members 72R, 72L, a front bulkhead 75 joined to front parts of the right and left front side frames 71R, 71L and front parts of the right and left upper members 72R, 72L, and a front bumper beam not shown extending between the front ends of the right and left front side frames 71R, 71L.

The steering gearbox 30 and the body reinforcing bar 50 extend transversely to the vehicle, bridging the right and left front side frames 71R, 71L. The engine, harness and pipes are omitted in FIG. 2. In the figure, reference numerals 76R, 76L denote front pillars, and 77R, 77L side sills.

Figure 3:
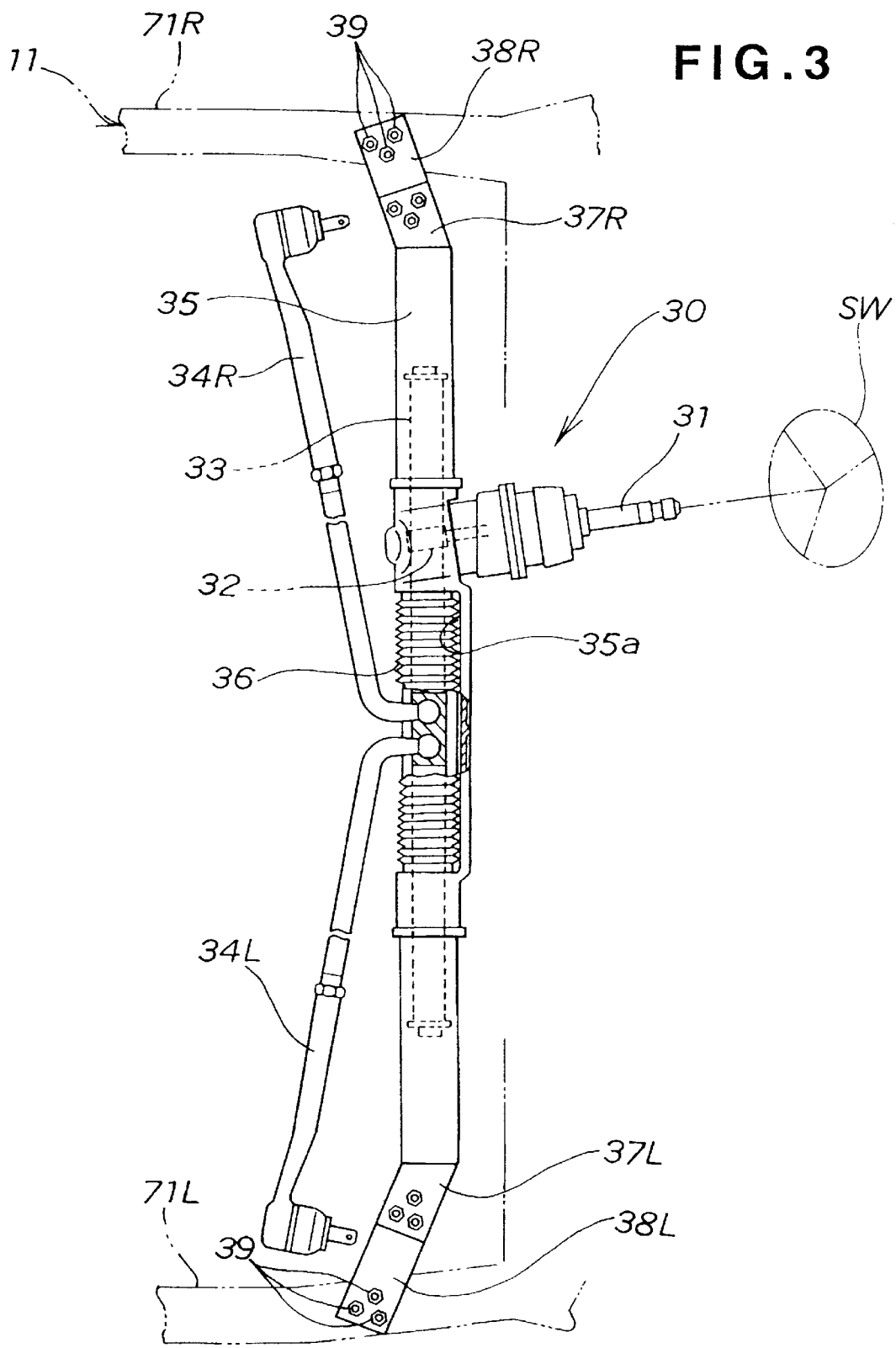
FIG. 3 is a top section-in-part view of the steering gearbox as shown in FIG. 2.

FIG. 3 shows the steering gearbox 30. In FIG. 3, the steering gearbox 30 has a steering shaft 31 connected to a steering wheel SW, which shaft 31 moves right and left tie rods 34R, 34L transversely to the vehicle to steer front wheels not shown.

The steering gearbox 30 is a center-takeoff steering device that includes the steering shaft 31, a pinion 32 provided at an end of the steering shaft 31, a rack shaft 33 extending transversely with a rack engaging with the pinion 32, the right and left tie rods 34R, 34L with their proximal ends connected to the longitudinally center part of the rack shaft 33, a box member 35 housing the steering shaft 31 and the rack shaft 33, and a rubber boot 36 covering the proximal end parts of the tie rods 34R, 34L.

The box member 35 is provided at the lateral both ends with brackets 37R, 37L. The brackets 37R, 37L are floatingly supported by stays 38R, 38L. The stays 38R, 38L are detachably mounted to the right and left front side frames 71R, 71L via bolts 39. Thus the steering gearbox 30 is mounted to the right and left front side frames 71R, 71L. The wording "floatingly supported" means that the brackets 37R, 37L are mounted to the stays 38R, 38L through elastic members such as rubber bushes to be supported in a floatable condition. The floating support can limit the transferring of vibration from the front side frames 71R, 71L to the steering gearbox 30.

Figure 4:
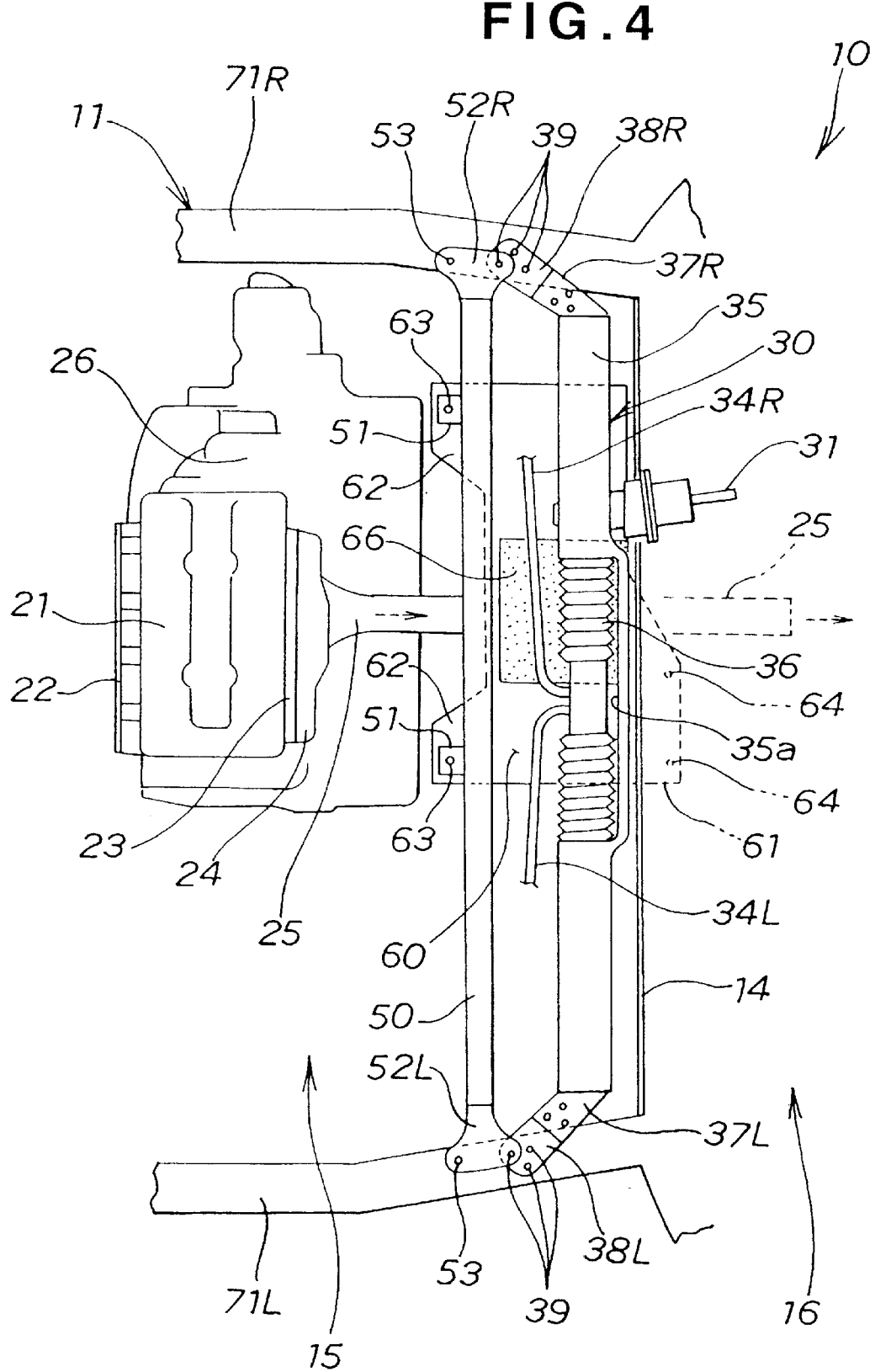
FIG. 4 is a top view showing details of the vehicle front structure as shown in FIG. 2.

FIG. 4 shows the vehicle front structure with the harness and pipes omitted in a plan view. The steering gearbox 30 is, as described above, a center-takeoff steering device, and thus has a large cut-out part 35a in the longitudinally middle part of the box member 35. From the cut-out part 35a, the tie rods 34R, 34L protrude to extend transversely to the vehicle. Thus the box member 35 with the cut-out part 35a has relatively small rigidity, being susceptible to the influence of rigidity of the front part of the body 11.

To deal with this, this embodiment provides stays 52R, 52L at both ends of the body reinforcing bar 50. The stays 52R, 52L are detachably mounted to the right and left front side frames 71R, 71L at the body front part via bolts 53, to extend the body reinforcing bar 50 between the right and left front side frames 71R, 71L, thereby to reinforce the front part of the body 11. Consequently, the body 11 has at its front part increased flexural rigidity and torsional rigidity so as to largely limit bending strength and torsional strength transferred from the body 11 to the box member 35. Thus excessive external forces are not applied from the body 11 to the box member 35, which improves stability in maneuvering the steering gearbox 30.

It is also possible to fix the body reinforcing bar 50 to the right and left front side frames 71R, 71L by welding instead of connecting via bolts. However, non-detachability of the body reinforcing bar 50 would deteriorate workability in maintenance/checking of the small engine compartment 15. On the contrary, this embodiment detachably mounts the body reinforcing bar 50 to the front side frames 71R. 71L via the bolts 53, permitting easy maintenance/checking of the engine compartment 15.

The stays 52R, 52L of the body reinforcing bar 50 are partly overlapped with the stays 38R, 38L of the steering gearbox 30 to be fastened together via bolts 39, 39 to the front side frames 71R, 71L.

The heat shielding plate 60 and the heat insulating material 66 are interposed where the steering gearbox 30, harness 41 and pipes 42 (See FIG. 1) are overlapped with the exhaust pipe 25. The heat shielding plate 60 has a lateral width set generally as large as the lateral width of the transmission 26. As a result, heat from the engine 21 and the exhaust pipe 25 is blocked by the heat shielding plate 60 not to directly affect the steering gearbox 30, harness 41 and pipes 42.

Further, the heat insulating material 66 has a lateral width set about three times as large as the diameter of the exhaust pipe 25 to further limit thermal effect from the exhaust pipe 25 to the steering gearbox 30, harness 41 and pipes 42. In particular, for the rubber boot 36 with relatively small heat resistance in the steering gearbox 30, positioned above the exhaust pipe 25, it is significantly effective to limit thermal effect with the heat insulating material 66.

Now the function of the vehicle front structure will be described with reference to FIGS. 1 and 5.

As shown in FIG. 1, the heat shielding plate 60 mounted between the dashboard 12 and the body reinforcing bar 50 is positioned between the exhaust pipe 25 and the steering gearbox 30, harness 41 and pipes 42. Heat (mostly radiant heat) transmitted from the exhaust pipe 25 to the steering gearbox 30, harness 41 and pipes 42 is blocked by the heat shielding plate 60. Thus the thermal effect from the exhaust pipe 25 to the steering gearbox 30 and the other components is limited by the heat shielding plate 60, which allows the use of the steering gearbox 30 and the other components in a best mode on a constant basis.

If the exhaust pipe 25 is arranged closer to the dashboard 12, heat (mostly radiant heat) transferred from the exhaust pipe 25 to the dashboard 12 is blocked by the heat shielding plate 60. As a result, heat of the exhaust pipe 25 is hardly transferred to the passenger compartment 16. Consequently, an air conditioner not shown has an increased effect in cooling the passenger compartment 16.

The heat insulating material 66 provided on at least one side of the heat shielding plate 60 further limit thermal effect from the exhaust pipe 25 to the steering gearbox 30, harness 41 and pipes 42.

FIG. 5 shows the engine 21 set back from an original position in a phantom line to a position in a solid line upon a collision of the vehicle 10.

The engine 21 set back upon the collision of the vehicle 10 pushes the exhaust pipe 25 to deform it and set it back. At the same time, the body reinforcing bar 50 and the heat shielding plate 60 are pushed by the engine 21 and the exhaust pipe 25 to be deformed and set back, then to hit against the steering gearbox 30, harness 41 and pipes 42. The high-heated engine 21 and the exhaust pipe 25 set back by the collision of the vehicle 10 do not directly hit against the steering gearbox 30, harness 41 or pipes 42 because of the presence of the body reinforcing bar 50 and the heat shielding plate 60. Thus the steering gearbox 30, harness 41 and pipes 42 do not directly receive thermal effect from the engine 21 and the exhaust pipe 25.

Because the steering gearbox 30 is arranged in a higher position than the transmission 26 protruded rearward of the engine 21, the transmission 26 does not interfere with the steering gearbox 30 when the engine 21 is set back upon a collision of the vehicle 10. Accordingly, the amount of setback of the transmission 26 is sufficiently secured.

The heat insulating material 66 provided at least on the surface of the heat shielding plate 60 at the side of which surface the steering gearbox 30, harness 41 and pipes 42 are located, serves as a cushion at a time of collision, alleviating impact to the steering gearbox 30, harness 41 or pipes 42.

In the above embodiment of the present invention, the vehicle 10 can be any vehicle that has the engine compartment 15 in a front part of the body 11 in which the engine 21 can be accommodated, such as a front-engine front-wheel drive (FF) vehicle in a drive system to drive front wheels by the engine 21 and a 4WD vehicle in a drive system to drive front and rear wheels by the engine 21.

The heat shielding plate 60 can be any of arbitrary material, shape and size as long as being interposed between the exhaust pipe 25 extending from the rear part of the engine 21 to the rear of the vehicle and the steering gearbox 30, harness 41 and pipes 42 extending transversely to the vehicle, to limit thermal effect from the exhaust pipe 24 to the steering gearbox 30, harness 41 and pipes 42. The same is applied to the heat insulating material 66 provided on the heat shielding plate 60.

Obviously, various minor changes and modifications of the present invention are possible in the light of the above teaching. It is therefore to be understood that within the scope of the appended claims the invention may be practiced otherwise than as specifically described.

What is claimed is:

1. A front structure for a vehicle comprising:
   a dashboard for partitioning a front part of a body of the vehicle into an engine compartment for accommodating an engine and a passenger compartment;
   an exhaust pipe extending from a rear part of the engine, beneath the passenger compartment, toward a rear part of the vehicle;
   a body reinforcing bar extending between said dashboard and said exhaust pipe transversely of the vehicle and detachably mounted at both ends thereof to right and left front side frames in the front part of the body; and
   a heat shielding plate interposed between said dashboard and said exhaust pipe and having a rear end mounted to a lower part of said dashboard and a front end mounted to said body reinforcing bar.

2. A front structure as set forth in claim 1, further comprising a steering gearbox extending transversely of the vehicle between said dashboard and the engine.

3. A front structure as set forth in claim 2, further comprising a harness and a plurality of pipes extending transversely of the vehicle between said dashboard and the engine.

4. A front structure as set forth in claim 3, wherein said heat shielding plate is interposed between said steering gearbox, said harness and said pipes as a group, and said exhaust pipe.

5. A front structure as set forth in claim 1, wherein said heat shielding plate has a heat insulating material provided at least on one side thereof.

6. A front structure as set forth in claim 5, wherein said heat insulating material is located above said exhaust pipe.

7. A front structure as set forth in claim 2, further comprising a transmission provided on a lower part of the engine and having a rear end protruded rearwardly of the engine, said steering gearbox being arranged at a position higher than said transmission.

* * * * *